United States Patent [19]

Spencer et al.

[11] Patent Number: 5,696,571
[45] Date of Patent: Dec. 9, 1997

[54] CLIP-ON TYPE SUNGLASSES WITH BRIDGE MOUNTING

[75] Inventors: Jack N. Spencer, Plymouth, Minn.; Charles Heck, Cranford, N.J.

[73] Assignee: Made in the Shades Optical, Inc., Minneapolis, Minn.

[21] Appl. No.: 590,996

[22] Filed: Jan. 24, 1996

[51] Int. Cl.⁶ ................................ G02C 9/00; G02C 7/10
[52] U.S. Cl. .................................... 351/47; 351/44
[58] Field of Search ............................ 351/41, 44, 47, 351/48, 57, 58, 124

[56] References Cited

FOREIGN PATENT DOCUMENTS 631218  12/1961  Italy ................................... 351/48

*Primary Examiner*—Huy Mai
*Attorney, Agent, or Firm*—Law Office of Mitchell P. Novick

[57] ABSTRACT

Clip on type sunglasses include an improved mounting arrangement in which the bridge portion of the sunglass frame is adapted to fit behind the bridge of the eyeglasses on which the sunglasses are mounted, forming part of the mounting arrangement which also includes a pair of mounting clips, one located at the bottom of each eyewire, at the middle thereof, which receive the lower edges of the frame of the eyeglasses on which the sunglasses are mounted, the use of the bridge portion of the sunglasses as part of the mounting arrangement eliminates the need for mounting clips on the upper portion of the sunglass frame.

11 Claims, 3 Drawing Sheets

CLIP-ON TYPE SUNGLASSES WITH BRIDGE MOUNTING

FIELD OF THE INVENTION

The present invention relates to clip on type sunglasses, and more particularly, to clip on type sunglasses having a bridge member that is adapted for mounting the sunglasses on a pair of eyeglasses.

BACKGROUND OF THE INVENTION

In most known clip on type sunglasses, the eyewires in which the sunglass lenses are mounted, or the sunglass lenses themselves in the case of frameless glasses, are joined at their top edges by a bridge member in the form of a bar or strip of a resilient, flexible material. Typically, the bridge member extends above the lenses and is bowed slightly outwards away from the lenses for biasing the lenses toward one another. To mount clip on sunglasses of this type on a pair of eyeglasses, the lenses are rotated away from one another, flexing the bridge member. Then, the lenses are positioned juxtaposed with the eyeglass lenses, and then released, whereupon clips that are provided on the outer edges of the sunglass lenses are brought into engagement with the eyeglass frame for securing the sunglasses to the eyeglasses. The sunglasses are held in place on the eyeglasses due to the resilience of the bridge member which urges the clips into engagement with the eyeglass frame Conventionally, clip on type sunglasses include four such clips, two clips located along the outer edge of the left sunglass lens and two clips located along the outer edge of the right sunglass lens. To remove the sunglasses, the wearer merely grasps the sunglass lenses at their top and bottom edges and rotates the lenses outwardly away from each other, which action moves the clips out of engagement with eyeglass frame.

Although this type of clip mount provides for easy mounting and removal of the sunglasses, a downside of this mounting arrangement is that the clips on one or both sides can become disengaged inadvertently, releasing the sunglasses whenever an outwardly directed force is applied to one or both of the sunglass lenses, which can be a common occurrence if the wearer is participating in sports or other activities.

Moreover, this type of clip mount requires four clips for securing the sunglasses to the eyeglasses. Many sunglasses have lenses that are made of a light weight plastic so that the weight of the pair of sunglasses is determined primarily by the frame and the clips. As such, the clips represent a significant portion of the weight of the sunglasses. Because clip on type sunglasses add weight to the eyeglasses on which they are mounted, it is desirable to minimize the weight of the clip on type sunglasses.

A further consideration is that most eyeglass wearers select the eyeglass frames that best complement their face. Eyeglasses that are currently very popular have a single bridge frame, with the bridge located at a height that is below the upper edge of the lenses. However, the bridge of most known clip on sunglasses extends above the lenses. Consequently, when mounted on eyeglasses having a single bridge frame, such clip on sunglasses are will give the eyeglasses the appearance of a double bar frame.

For the reasons stated above, and for other reasons stated below which will become apparent to those skilled in the art upon reading and understanding the present specification, there is a need in the art for clip on type sunglasses which better conform to the shape of the eyeglasses with which they are used and which are characterized by a more secure mounting arrangement that substantially prevents the release of the sunglasses from the eyeglasses on which they are mounted unless such release is intentional. Moreover, there is a need for clip on type sunglasses that are of a reduced weight.

SUMMARY OF THE INVENTION

The present invention provides a pair of clip on type sunglasses that are adapted to be mounted on a pair of eyeglasses having first and second eyeglass lenses that are supported by a support means including a bridge element. The sunglasses include first and second lens assemblies that are joined by a bridge member forming a unitary structure. The bridge member is constructed and arranged to extend between the two lens assemblies located below a plane that contains the upper edges of the two lens assemblies. The first lens assembly includes a first mounting clip that is located at the lower edge, near the middle thereof, and which extends outwardly from the back of the first lens assembly. The second lens assembly includes a second mounting clip that is located at the lower edge, near the middle thereof, and which extends outwardly from the back of the second lens assembly.

The bridge member of the sunglass frame is adapted to fit behind the bridge portion of the eyeglasses on which the sunglasses are mounted, forming part of the mounting arrangement which also includes the two mounting clips. The use of the bridge member as part of the mounting arrangement eliminates the need for mounting clips on the upper portion of the sunglass frame and allows the sunglasses to better conform to the shape of the eyeglasses on which they are mounted. Moreover, using the bridge member to secure the upper edge of the sunglasses to the eyeglasses and locating the two mounting clips near the middle of the lower edges of the eyewires, results in a more secure mounting than is provided by conventional clip on sunglasses which include four clips on the outer edges of the sunglass lenses which are brought into engagement with the eyeglass frame for securing the sunglasses to the eyeglasses.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

Figure 1:
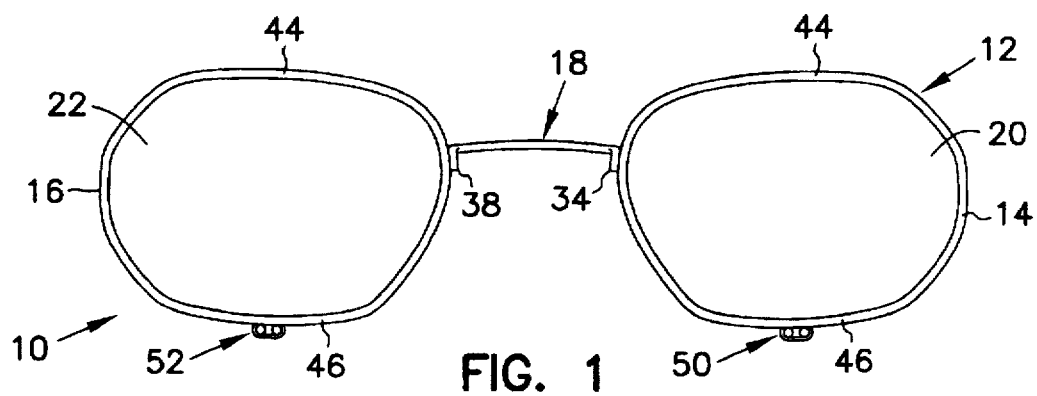
FIG. 1 is a front elevational view of a pair of clip on type sunglasses provided by the present invention.

Referring to the drawings, FIG. 1 is a front elevational view of a pair of clip-on sunglasses 10 provided by the present invention. The sunglasses include a frame, or front 12 including a left eyewire 14 and a right eyewire 16 joined by a bridge member 18. The terms left and right, as used herein, refer to the orientation of the sunglasses relative to the left and right eyes of a person wearing the sunglasses. The left eyewire 14 contains a left sunglass lens 20 forming a first lens assembly and the right eyewire 16 contains a right sunglass lens 22 forming a second lens assembly. Although in the preferred embodiment, the sunglasses include a frame 12 with a pair of eyewires 14 and 16 for supporting the sunglass lenses 20 and 22, it will be apparent to those skilled in the art that the bridge member 18 can join the sunglass lenses 20 and 22 directly, in case which no eyewires would be provided. Accordingly, the term lens assembly, as used herein, is intended to refer both to the embodiment illustrated in the drawings wherein the lenses 20 and 22 are mounted in eyewires 14 and 16 which are joined by the bridge member 18, and an embodiment which does not include a frame and the bridge member 18 is connected directly to the lenses 20 and 22.

Figure 2:
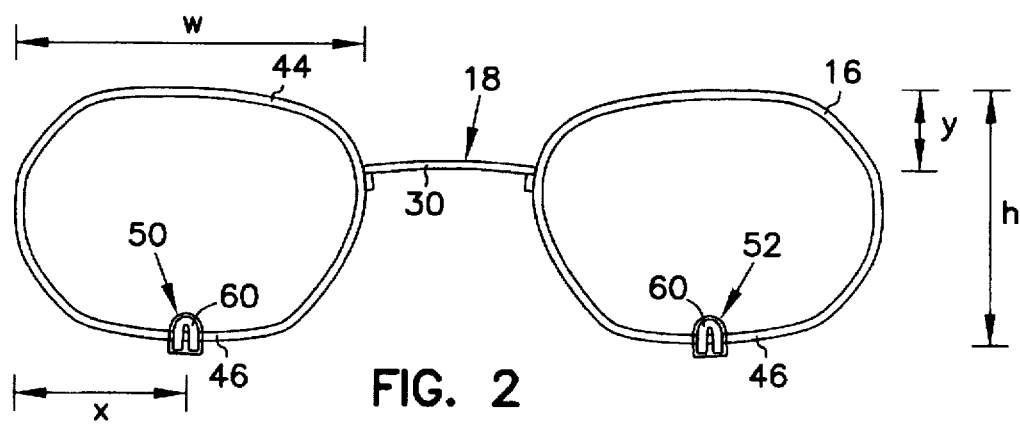
FIG. 2 is a rear view of the sunglasses of FIG. 1.
Figure 3:
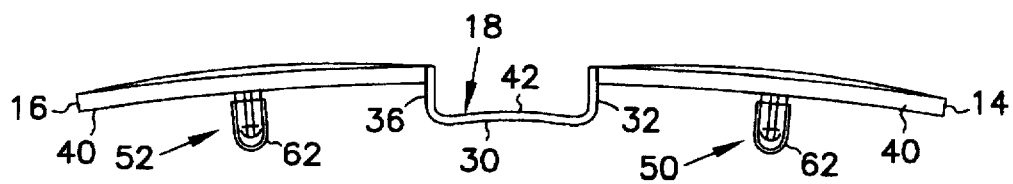
FIG. 3 is a top view of the sunglasses of FIG. 1.
Figure 4:
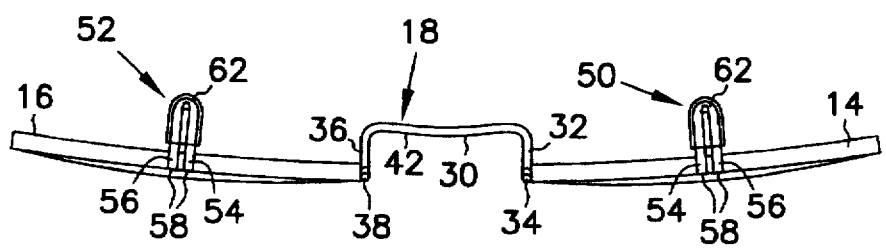
FIG. 4 is a bottom rear view of the sunglasses of FIG. 1.
Figure 5:
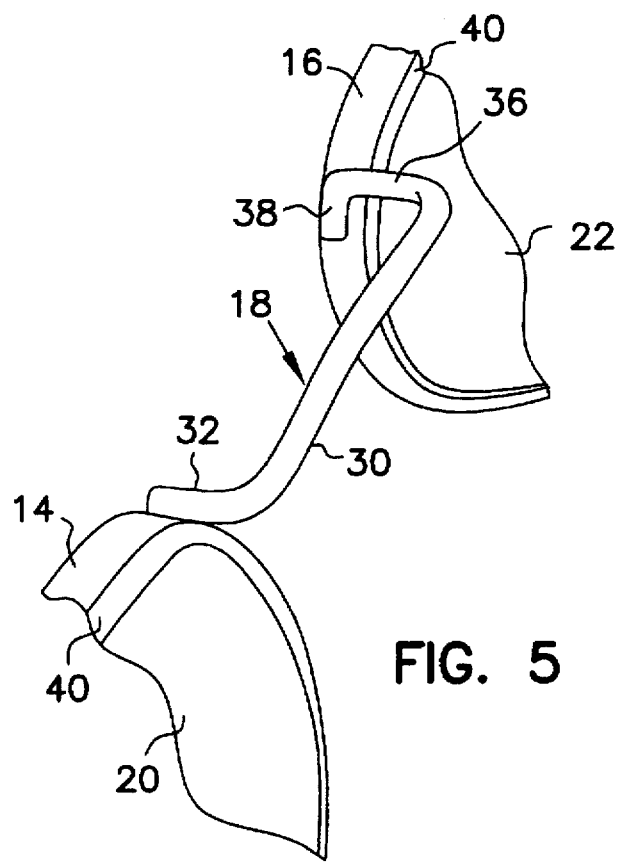
FIG. 5 is an enlarged fragmentary perspective view of a portion of the sunglasses of FIG. 1 and illustrating details of the bridge member.
Figure 11:
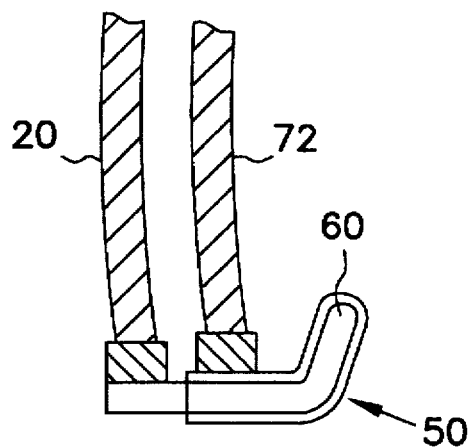
FIG. 11 is an enlarged vertical section view taken along the line 11—11 of FIG. 8.
Figure 6:
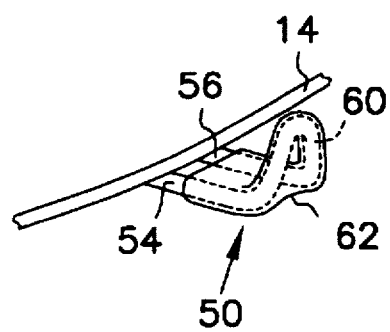
FIG. 6 is an enlarged fragmentary perspective view of a further portion of the sunglasses of FIG. 1 and illustrating details of one of the mounting clips.

Referring now to FIGS. 1–5, the bridge member 18 is a thin wire-like element having an elongated main body portion 30, a left arm 32 that terminates in a downwardly extending mounting tab 34 that connects to the left eyewire 14 and a right arm 36 that terminates in a downwardly extending mounting tab 38 that connects to the right eyewire 16. The main body portion 30 of the bridge member is offset rearwardly of the back edges 40 of the eyewires 14 and 16, and thus, rearwardly of the back surfaces of the sunglass lenses. As is illustrated in FIGS. 3 and 4, the main body portion 30 of the bridge member 18 is bowed forwardly slightly, i.e., in a direction towards the back edges 40 of the eyewires, at its middle as indicated by reference numeral 42. In the embodiment illustrated in the drawings, the main body portion 30 of the bridge member 18 extends generally horizontally, as illustrated in FIGS. 1 and 2. However, the main body portion of the bridge member 18 can be bowed upwardly.

The bridge member 18 is mounted to the eyewires at locations intermediate the upper edges 44 and the lower edges 46 of the eyewires 14 and 16. In the preferred embodiment, the bridge member 18 is connected to the eyewires at about one-third the distance from upper edges 44 to the lower edges 46, and the bridge member 18 lies in a plane extending below a plane containing the upper edges of the eyewires 14 and 16.

Referrng to FIGS. 1–4 and 6, a mounting clip 50 is secured to the left eyewire 14 at the lower edge 46 thereof and located near the middle of the lower edge 46 and preferably at the middle of the lower edge 46. A further mounting clip 52 is secured to the right eyewire 16 at the lower edge 46 thereof and located near the middle of the lower edge 46 and preferably at the middle of the lower edge 46. By way of illustration, the mounting clips 50 and 52 can be formed by bending a short length of wire in half to form parallel horizontally extending segments 54 and 56 which have their free ends 58 secured to the eyewires, with the other end of the wire being bent up forming a U-shaped distal end 60 for the mounting clip. The mounting clips have a protective coating 62, of rubber or silicone, for example, to guard against scratching the frame of eyeglasses on which the sunglasses are mounted.

The eyewires 14 and 16 of the sunglass frame, and the bridge member 18 are made in the conventional manner. The bridge member 18 is secured to the eyewires 14 and 16 by welding or any other suitable manner, to form the frame 12. Also, the mounting clips 50 and 52 are formed in the conventional manner and secured to the eyewires by welding or another suitable manner. In the preferred embodiment, the frame, the bridge member and the mounting clips are made of a base metal, such as monel metal, stainless steel, titanium, or nickel, and plated with gold, silver, stainless steel, nickel or titanium, for example. Moreover, although preferably the eyewires, the bridge and the mounting clips are made of metal, the eyewires, the bridge and the mounting clips can be made of non-metal materials, such as zyl, for example.

Referring to FIG. 2, in one embodiment of the sunglasses that was constructed, the width "w" of the eyewires 14 and 16 was approximately 2 inches. The top to bottom dimension "h" was approximately 1.5 inches. The distance "y" from the top edge 44 to the location of the points at where the bridge member 18 is secured to the eyewires was approximately 0.5 inch. The distance "x" from the outer edge of the eyewires to the points at which the mounting clips 50 and 52 are attached to the eyewires was approximately 1 inch. The length of the main body portion 30 of the bridge member 18 was approximately 1 inch, and the length of the arm portions 32 and 36 was approximately ⅛ inch so that the main body portion of the bridge member was offset rearwardly approximately ⅛ inch relative to the rear edge 40 of the eyewires 14 and 16. The length of the mounting clips 50 and 52 was approximately ⅜ inch, so that the upturned ends 60 thereof were located rearwardly approximately ⅛ inch from the rear edges 40 of the eyewires 14 and 16. These dimensions are given by way of illustration of one particular embodiment and are not intended as a limitation of the scope of the invention as defined by the appended claims. Moreover, although a particular shape and size has been illustrated in the drawings, the sunglasses can be made in different shapes and sizes to more closely conform to the shape and size of the eyeglasses with which they are used.

Referring to FIGS. 7–11, the sunglasses 10 are shown mounted on a pair of conventional eyeglasses 70. The eyeglasses 70 include left and right eyeglass lenses 72 and 74 that are supported in a side-by-side relationship in a frame or support means 75 including eyewires 76 and 78 which are joined by a bridge 80. The frame 75 has hinge mounts 82 for mounting temples (not shown). Although the eyeglasses 70 include a frame 75, this is merely by way of illustration of the application of the sunglasses provided by the invention, and it will be apparent that the sunglasses 10 can be mounted on frameless eyeglasses.

Figure 7:
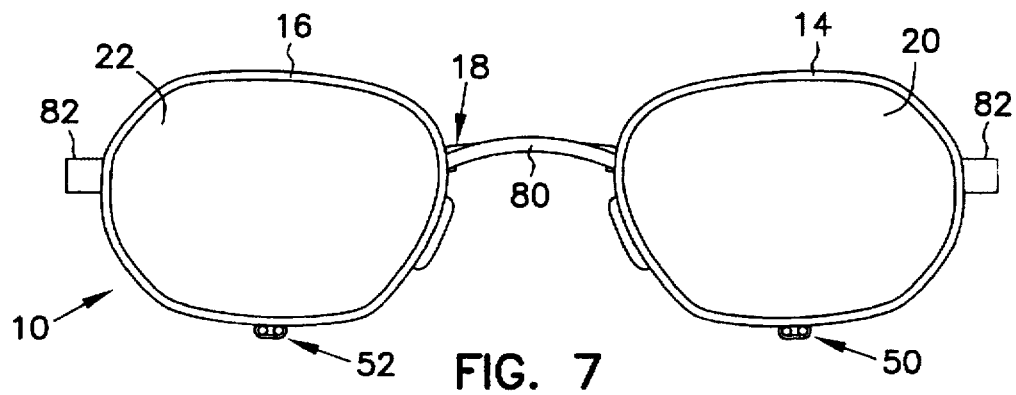
FIG. 7 is a front elevational view of the clip on type sunglasses provided by the invention shown assembled on a pair of eyeglasses.
Figure 8:
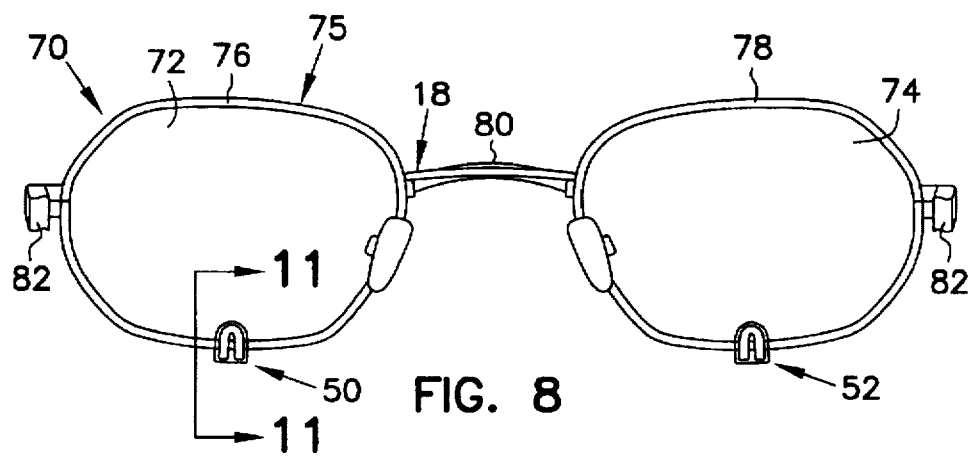
FIG. 8 is a rear view of the assembly of FIG. 7.

As is shown in FIGS. 7 and 8, when the sunglasses 10 are mounted on the eyeglases 70, the bridge member 18 is juxtaposed with the bridge member 80 of the eyeglasses rather than extending above the eyeglasses, as is the case for conventional clip on sunglasses and which creates a double bridge look for the combined glasses and sunglasses. Moreover, there are no mounting clips on the upper edge of the glasses. The bridge member 18 and the two mounting clips 50 and 52, that are located at the bottom of the lower edge near the middle thereof, secure the sunglasses to the eyeglasses. The mounting clips 50 and 52 can be adjusted using a needle nose pliers to be bent inward or outward to decrease or increase the space 84 (FIG. 11) between the ends 60 of the mounting clips and the eyeglass frame.

Figure 9:
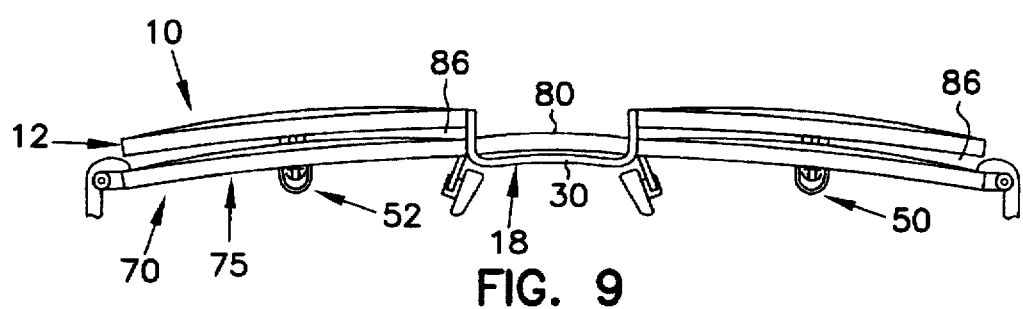
FIG. 9 is a top view of the assembly of FIG. 7, and illustrating the gap provided between the sunglass frame and the eyeglass frame.
Figure 10:
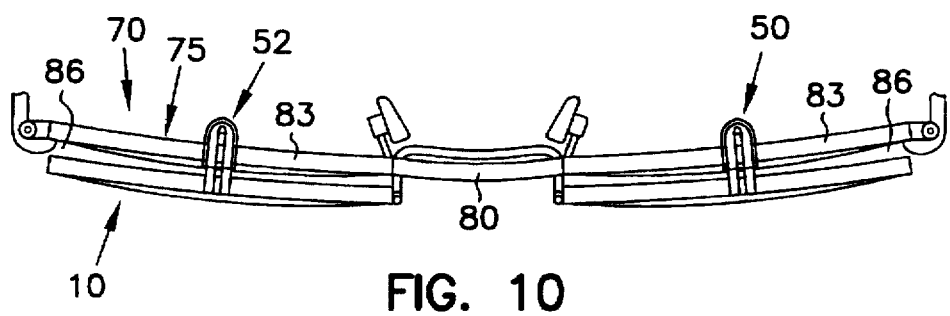
FIG. 10 is a bottom view of the assembly of FIG. 7.

As is shown in FIGS. 9 and 10, the bridge member 18 of the sunglasses 10 fits behind the bridge 80 of the eyeglasses 70. The mounting clips 50 and 52 receive the bottom edges 83 of the left and right eyewires 76 and 78, respectfully. The rearward displacement of the bridge member 18 and the rearward extension of the mounting clips 50 and 52 enable the sunglass frame 12 to be spaced from the eyeglass frame 75 forming a gap 86 therebetween as shown in FIGS. 9 and 10, for example. This enables the sunglasses 10 to be used with eyeglasses that have ultra thin lenses, eyeglasses that have relatively thick lenses, as well as eyeglasses having lenses which range in size from ultra thin lenses to relatively thick.

Referring to FIGS. 7–11, to mount the sunglasses 10 on the eyeglasses 70, the sunglasses, either while being worn or while being held in the hands of the wearer, are aligned with the eyeglasses with the left lens assembly overlying the left eyeglass lens 72 and the right lens assembly overlying the right eyeglass lens 74 and with one of the mounting clips, mounting clip 50 in this case, positioned on the lower edge of the eyewire 76, "hooking" the left side of the sunglasses to the eyeglasses. Then, the right lens assembly is rotated slightly in the direction away from the left lens assembly to flex the bridge member 18 allowing the other mounting clip 52 to clear the side of the eyewire 78 and raising the bridge member 18 slightly above the bridge element 80 of the eyeglasses. Then, bridge member 18 is moved rearwardly over and behind the bridge element 80 and the right lens assembly is released, allowing the bridge member 18 to restore, moving the mounting clip 52 into underlying relation with the right eyeglass eyewire 78. To remove the sunglasses 10 from the eyeglasses, a similar, but opposite procedure is used. First one of the lens assemblies, such as the right lens assembly is rotated away from the other lens assembly flexing the bridge member 18. As the bridge member is flexed, the mounting clip 50 or 52 is moved out of engagement with the eyeglass frame, and the sunglasses 10 can be removed.

Alteratively, the sunglasses 10 can be mounted on the eyeglasses by first engaging both of the mounting clips 50 and 52 on the bottom edge of the eyeglass frame and then pivoting the sunglasses upwardly until the bridge member 18 is located adjacent to the bridge element 80 of the eyeglass frame. The bridge member 18 then can be worked up and over the bridge by manipulating with the thumb and forefinger, effectively sliding the bridge member 18 over the bridge element 80 to the position illustrated in FIGS. 9 and 10, for example, where the bridge member 18 is located behind the bridge element 80. The reverse procedure is used to remove the sunglasses.

Thus, the present invention has provided clip on type sunglasses in which the bridge portion of the sunglass frame is adapted to fit behind the bridge of the eyeglasses on which the sunglasses are mounted, forming part of the mounting arrangement. The mounting arrangement also includes a pair of mounting clips, one located at the bottom of each eyewire, at the middle thereof. The mounting clips receive the lower edges of the frame of the eyeglasses on which the sunglasses are mounted. The use of the bridge portion of the sunglasses as part of the mounting arrangement eliminates the need for mounting clips on the upper portion of the sunglass frame and allows the sunglasses to better conform to the shape of the eyeglasses on which they are mounted.

What is claimed is:

1. A pair of clip-on type sunglasses adapted to be mounted on a pair of eyeglasses having first and second eyeglass lenses that are supported in a side-by-side relationship by a support means including a bridge element, said pair of sunglasses comprising:

a first lens assembly including a first sunglass lens having an upper edge, a lower edge, a front and a back;

a second lens assembly including a second sunglass lens having an upper edge, a lower edge, a front and a back;

a bridge member joining said first and second lens assemblies forming a unitary structure, said bridge member being constructed and arranged to extend between said first and second lens assemblies, located below a plane containing said upper edges of said first and second lens assemblies, said bridge member further comprising a main portion that is offset rearwardly relative to said backs of said first and second lens assemblies thereby forming a gap between and perpendicular to said main portion and said first and second lens assemblies, said gap being able to accommodate said bridge element;

said first lens assembly including a first mounting clip located at said lower edge of said first lens assembly and near the middle of said lower edge and extending outwardly from said back first lens assembly; and said second lens assembly including a second mounting clip located at the lower edge of said second lens assembly and near the middle of said lower edge and extending outwardly from said back of said second lens assembly.

2. The sunglasses of claim 1, wherein said main body portion of said bridge member is bowed inwardly toward said backs of said first and second lens assemblies.

3. The sunglasses of claim 1, wherein said mounting clips have a protective coating.

4. The sunglasses of claim 3, wherein said protective coating is rubber.

5. The sunglasses of claim 1, wherein said first and second lens assemblies includes first and second eyewires, respectively.

6. The sunglasses of claim 5, wherein said first and second mounting clips are secured to said first and second eyewires, respectively, and extend rearwardly thereof.

7. The sunglasses of claim 6, wherein said bridge member includes a main portion that is offset rearwardly relative to the rear edges of said first and second eyewires, permitting said first and second eyewires to be spaced apart from said support means when the sunglasses are mounted on the eyeglasses.

8. A pair of clip-on type sunglasses adapted to be mounted on a pair of eyeglasses having first and second eyeglass lenses that are supported in a side-by-side relationship by a support means including a bridge element, said pair of sunglasses comprising:

a first eyewire containing a first sunglass lens, said first eyewire having an upper edge a lower edge, and a rear surface;

a second eyewire containing a second sunglass lens, said second eyewire having an upper edge, a lower edge, and a rear surface;

a bridge member joining said first and second eyewires, said bridge member being constructed and arranged to extend between said first and second eyewires, located below a plane containing said upper edges of said first and second eyewires, said bridge member further comprising a main portion that is offset rearwardly relative to said backs of said first and second lens assemblies thereby forming a gap between and perpendicular to said main portion and said first and second lens assemblies, said gap being able to accommodate said bridge element;

a first mounting clip secured to said first eyewire at said lower edge of said first eyewire and near the middle of said lower edge; and a second mounting clip secured to said second eyewire at said lower edge of said second eyewire and near the middle of said lower edge.

9. The sunglasses of claim 8, wherein said main portion of said bridge member is bowed inwardly toward said rear surfaces said first and second eyewires, and wherein said first and second mounting clips project rearwardly from said rear surfaces beyond said main portion of said bridge member.

10. The sunglasses of claim 8, wherein said mounting clips have a protective coating.

11. The sunglasses of claim 10, wherein said protective coating is rubber.

* * * * *